United States Patent [19]

Pearce et al.

[11] Patent Number: 5,194,870
[45] Date of Patent: Mar. 16, 1993

[54] RADAR RECEIVER

[75] Inventors: Timothy H. B. Pearce, Chelmsford; Brent Summers, Hatfield Peveral, both of United Kingdom

[73] Assignee: The Marconi Company Limited, Middlesex, United Kingdom

[21] Appl. No.: 564,020

[22] Filed: Aug. 7, 1990

[30] Foreign Application Priority Data

Aug. 25, 1989 [GB] United Kingdom ............... 8919423

[51] Int. Cl.$^5$ ........................................... G01S 13/32
[52] U.S. Cl. ............................. 342/128; 342/189; 342/195; 342/200
[58] Field of Search .............. 342/128, 189, 195, 200

[56] References Cited

U.S. PATENT DOCUMENTS

| | | | |
|---|---|---|---|
| 4,028,700 | 6/1977 | Carey et al. | 342/194 |
| 4,078,234 | 3/1978 | Fishbein et al. | 342/110 |
| 4,176,351 | 11/1979 | DeVita | 342/111 |
| 4,618,863 | 10/1986 | Collins | 342/194 |
| 4,620,192 | 10/1986 | Collins | 342/128 |
| 4,866,448 | 9/1989 | Rocca et al. | 342/25 |
| 4,912,474 | 3/1990 | Paturel et al. | 342/191 |
| 4,963,877 | 10/1990 | Wood et al. | 342/25 |
| 5,072,223 | 12/1991 | Hethuin et al. | 342/122 |

*Primary Examiner*—John B. Sotomayor
*Attorney, Agent, or Firm*—Spencer, Frank & Schneider

[57] ABSTRACT

FMCW radar return signals are converted to i.f. in a front end section, digitised in an A-D converter, and reduced to in-phase and quadrature base band components at a lower sampling rate in a filter section. Returns are compared with a separate reference waveform signal from a generator for each range cell by a multiplier and an accumulate and dump function. The reference waveforms for subsequent range cells are delayed by one sample period. The provision of separate correlation of de-ramping for each range cell enables non-linear sweep wave forms to be employed, whereas the conventional method using a single Fourier Transform for all range cells simultaneously restricts operation to a linear sweep waveform.

8 Claims, 3 Drawing Sheets

RADAR RECEIVER

BACKGROUND OF THE INVENTION

This invention relates to radar receivers, particularly to those for FMCW radar signals.

CW radar is generally used in preference to pulse radar, in order to maximise the power transmitted by the radar for a given peak power capability. FM or chirp enables the radar return signals to be related to the transmitted signals.

Referring to FIG. 1, a method of relating the phase of the radar return signals to that of the transmitted signals, in order to determine the range of targets, consists of replacing the fixed local oscillator which conventionally converts incoming r.f. radio signals to i.f. signals, by an oscillator which produces a sweep signal in synchronism with the transmitted signal. R.f. radar return signals received at the antenna 1 are mixed by mixer 2 with oscillations from an oscillator 3 which are mixed by mixer 4 with the r.f. sweep oscillations. Typical received and reference sweep signals of bandwidth B and period T are shown in FIG. 2. The corresponding output of the mixer 2, representing the difference between the frequencies of the received and reference signals, will be of the form shown in FIG. 3. The output will be, except in the region of the flybacks, a constant difference frequency $\Delta f$ corresponding to the vertical displacement between received and reference sweep waveforms, since these sweeps are linear. This output $\Delta f$ of course corresponds to a target of a particular range. The phase of the received sweep, relative to the reference sweep, for a target at a different range will be different, and the output of the mixer 2 will have a component at a different frequency. For a target at one particular range, the received sweep will be in phase with the reference sweep, and the difference frequency will be zero. For ranges greater or less than that range, the difference frequency will be positive or negative. It follows that the range of targets illuminated by the transmitted FMCW signal can be detected by a frequency analysis of the output of the mixer 2, and this is done by performing a Fourier Transform e.g. an FFT on a signal derived from the output of the mixer. A typical result of such an analysis is shown in FIG. 4. Each vertical line indicates the amplitude of the radar return for a range cell centered on the range corresponding to that line. The large central component corresponds to the received waveform being in phase with the reference wave form. The corresponding range is 2/T, multiplied by the velocity of light. The other components correspond to targets at different ranges.

It will be noted that, with this method, known as the de-ramping method, the components on each side of the zero frequency (dc) component are narrow and are therefore well defined because the difference frequency remains constant, except in the region of the flyback, since the reference and received sweeps are linear.

The method of FIG. 1 is subject to a number of disadvantages. In the case of an array of antennas, such as might be used in the case of high frequency (HF) radar, it would be necessary to provide reference sweeps identical in amplitude and synchronised in phase at the receiver for each antenna, which could be widely spaced. An analogue signal could be fed to each receiver, but the lengths of the distribution lengths would differ, and distortions could be introduced into the sweep signals. The sweep signal could be generated digitally and fed digitally to each receiver. In this case, the mixer 2 would have to be supplied with a fixed local oscillator and the de-ramping with the digital sweep signal would have to take place after conversion of the analogue i.f. signals to digital form.

SUMMARY OF THE INVENTION

A second disadvantage with the method of FIG. 1 is that the well defined non-zero components of FIG. 4 require a linear sweep in order to produce them, whereas improved radar performance could be obtained in some circumstances by using a non-linear sweep.

The invention provides a radar receiver for an FMCW radar signal, comprising means for producing digitised signals derived from the radar return signals, and means for correlating the digitised signals corresponding to a modulation period with each of a series of digitised reference modulation signals which are delayed by predetermined periods with respect to each other, to produce outputs corresponding to respective range cells.

The correlation of the radar returns with a digitised reference signal for each range cell enables non-linear as well as linear sweeps to be used in the modulation of the signals.

The correlation for each range cell may be performed by a complex multiplication of the reference signal and the received signal over one sweep period, and the result may be summed in an accumulate and dump function which sums the results of the complex multiplication and is sampled once per sweep waveform repetition interval.

A digitally implemented FMCW radar receiver constructed in accordance with the invention will now be described by way of example, with reference to FIGS. 5 to 9 of the accompanying drawings, in which:

DETAILED DESCRIPTION OF THE PREFERRED EMBODIMENTS

Figure 1:
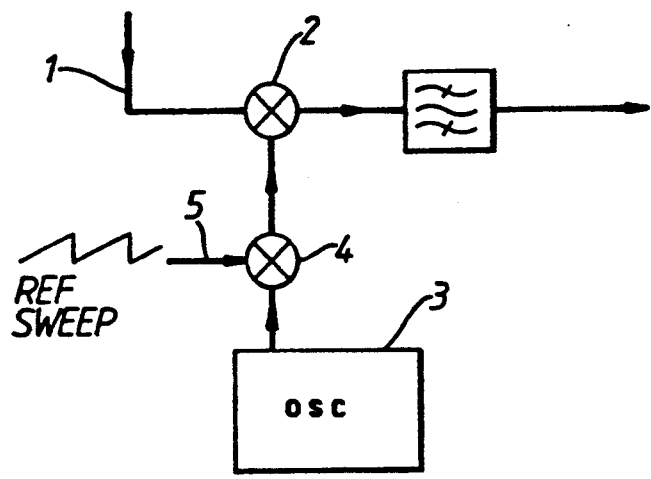
FIG. 1 is a diagram of a section of a prior art radar system.
Figure 2:
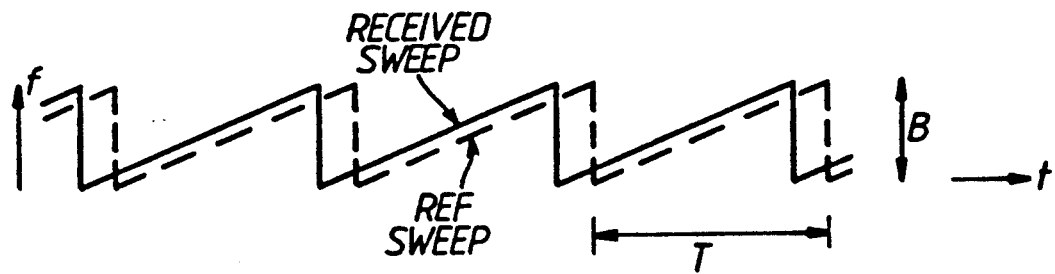
FIG. 2 is an illustration of typical waveforms of received and reference sweep signals of the prior art radar of FIG. 1.
Figure 3:
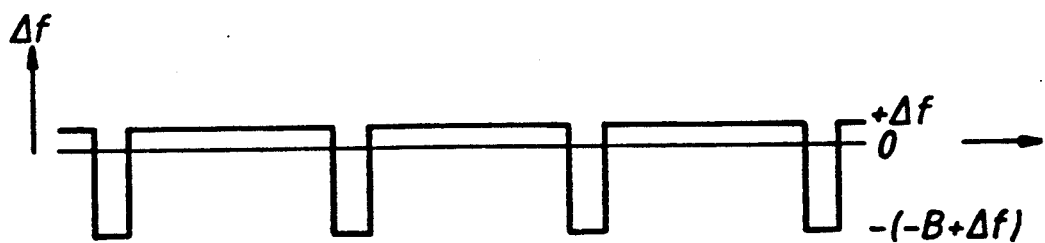
FIG. 3 is an illustration of a corresponding output of mixer 2 representing the difference between the received and reference signals of the prior art radar of FIGS. 1 and 2.
Figure 5:
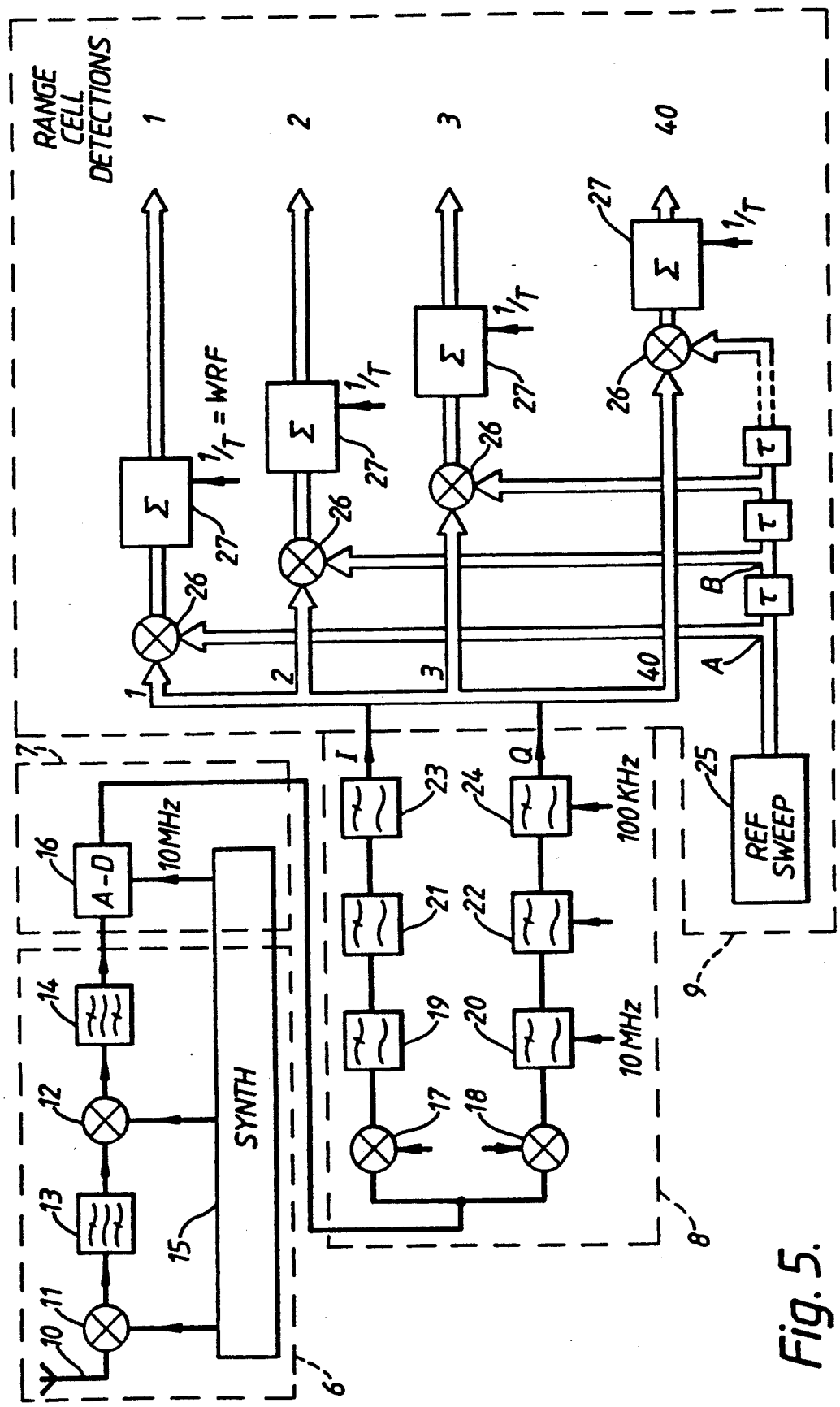
FIG. 5 is a block circuit diagram of the radar receiver according to an embodiment of the invention.

Referring to FIG. 5, the radar receiver comprises an r.f. front end section 6, an analogue-to-digital converter 7, a filter section 8, and a correlation section 9. The radar is designed to receive HF FMCW radar signals in the range of from 3 to 30 MHz. The sweep bandwidth may be 100 kHz at a repetition rate of typically 10 Hz.

The r.f. front end section is a two-stage superheterodyne conversion, in which desired frequencies from incoming radar returns received at the antenna 10 are mixed with a variable frequency at the mixer 11 and a fixed frequency signal at mixer 12, in order to provide an ultimate i.f. signal of 2.5 MHz. Appropriate band pass filters 13, 14 are provided. The local oscillator signals are provided by synthesiser 15.

The output of filter 14 is converted to digital form in an analogue-to-digital converter 16, sampling at 10 MHz.

In the filter section 8, mixers 17, 18 are supplied with two digital local oscillator signals at 2.5 MHz in phase quadrature to convert the digital signals from the A-D converter 16 to baseband I and Q signals.

Following this, digital filtering of the I and Q signals is carried out to remove both out of band quantising noise from the A-D converter 16 and to define the receiver pass band response. Since the implementation of a full F.I.R. filter directly at the 10 MHz sampling range is impracticable, decimation filters 19, 20 are employed to reduce the sampling rate, and F.I.R. filters 21, 23, 22, 24, are provided to effect a further reduction in the sampling rate to 100 kHz. This is sufficient to sample all the information in the sweep of 100 kHz, since this corresponds to 50 kHz for each in-phase and quadrature component.

In accordance with the invention, in a correlation section 9, a separate comparison of the I and Q baseband signals with a reference sweep waveform is made for each range cell, by cross-correlating the I and Q signals with each of a series of reference sweep waveforms delayed relative to each other.

The reference sweep waveform generator 25 contains digital samples clocked at 100 kHz in phase with the in-phase and quadrature components of the original 100 kHz linear sweep applied to the transmitted radar signal. The phase of the reference sweep is adjusted such that radar returns from a notional target in the centre of interest have sweeps exactly in phase with the reference sweep.

Figure 6:
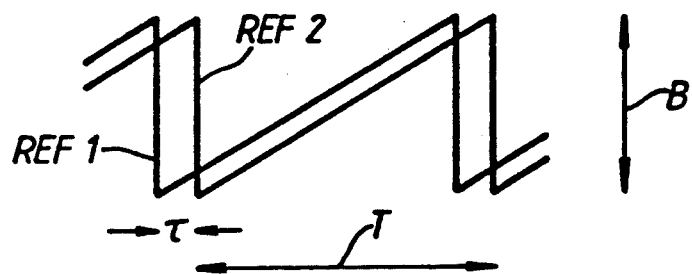
FIG. 6 is a representation of the reference signal at points A and B in FIG. 5.

Considering the first range cell, one complete sweeps worth of data samples is cross correlated with a reference waveform of the same length (the reference waveform in FIG. 6). Complex multiplier 26 multiplies successive I, Q samples corresponding to a sweep with the complex conjugate of the respective I, Q reference samples contained in generator 25. For this reason, generator 25 contains the complex conjugates of the reference waveform samples.

The stream of I, Q samples are then summed in complex form, in integrator 27 performing an accumulate and dump function. The output of the accumulate and dump function 27 is reset to zero after a complex summation function has been performed for the samples corresponding to one sweep of reference signals. Then complex summation is carried out for the next sweep samples. The output is sampled at a repetition frequency of T/1, where T is the repetition interval of the sweep waveform, so that one output is produced for each separate sweep.

The accumulate and dump 27 sampled at the rate of T/1 has a filtering characteristic of the form $$\frac{1}{N} \frac{\sin N\alpha}{\sin \alpha}$$

where N is the number of samples, and this has a maximum at zero frequency and a null at multiples of the sampling frequency divided by N. This has a result that if the sweep in the radar return received from a target is exactly in phase with the reference sweep, the response of the accumulate and dump is at its central maximum and an output is produced for the first range cell detection channel. This corresponds to the central line of the output of the Fourier Transform shown in FIG. 4 of the prior radar receiver. If, however, there was a target separated from the target at the center of the range of interest by a distance such that the sweep in the radar return was delayed relative to the reference sweep by one sample period (i.e. if the sweep in the return signal was in phase with the reference wave form 2 in FIG. 6), then the response of the accumulate and dump would be at the first null point to the right of the central peak. Consequently, a target at this range would not be detected at the output of the first range cell detection channel. If the unwanted target was separated from the wanted target by a non-integral multiple of sample periods then the residual target 'sidelobe' level would be determined by the $$\frac{1}{N} \frac{\sin N\alpha}{\sin \alpha}$$

characteristic. In practice the accumulation function is amplitude weighted through the FMCW modulation interval to achieve a greater suppression of the sidelobes of unwanted targets.

In general the correlation offers a superior time sidelobe performance compared with the de-ramping method as it implements a true correlation function.

Considering now the second range detection channel, the same process is carried on as in the first range cell detection channel, but this time the reference sweep is delayed by one sample period (see FIG. 6). Consequently, the second target referred to in the preceding paragraph corresponds to a maximum in the output of the accumulating dump, while the first target corresponds to a null in the output of the accumulating dump. Consequently, the second target produces the first line to the right of the main peak in the frequency distribution of FIG. 4.

Similarly, the third range cell detection channel provides an output if there is a target such that the radar return from it is in phase with the reference sweep delayed by two sample periods, and the other range cell detection channels produce zero output. The receiver has been shown as having 40 range cells, but any number could be provided.

Figure 4:
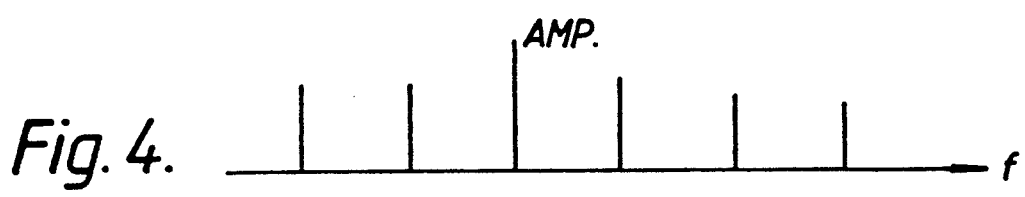
FIG. 4 illustrates a typical result of performing a Fast Fourier Transform analysis on a signal derived from mixer 2 of FIG. 1.
Figure 7:
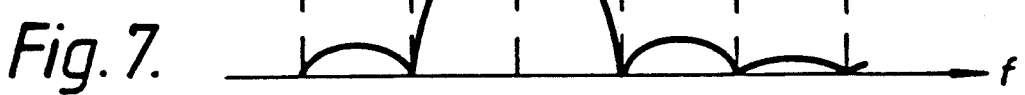
FIGS. 7 to 9 are representations of the response of three successive accumulate and dumps functions.
Figure 8:
Figure 9:
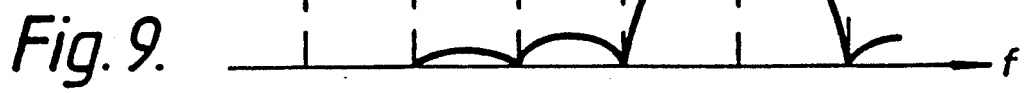

It will be apparent that, compared to the prior method of performing one FFT to produce the range cell output of FIG. 4, the method according to the invention performs separate de-ramping for each range cell i.e. separate correlation for each range cell. The advantage of this is that the restriction to linear sweeps of the FFT method is removed and non-linear sweep waveforms may equally well be employed.

The accumulate and dump may be realised by an adder, and one sample period memory, the output samples of which are continually fed back to and added to the next input samples, with a means of setting the memory to zero after reading the accumulated value at the end of a sweep period.

The radar receiver may actually consist of an array of antennas each with its own receiver. In this case, the frequency synthesiser 15 and reference sweep waveform generator 25 may be external to the receivers, and the signals may be fed to each receiver.

Of course variations may be made without departing from the scope of the invention. Thus, although a linear sweep has been shown for the sake of clearer explanation in FIG. 6, a non-linear sweep could equally well be employed. The invention applies to radar operating in different frequency bands from that referred to. Also, different values may be used for the i.f. frequencies the A-D converter and the reduced sampling rate. In this regard, the reduced sampling rate of 100 kHz is the minimum Nyquist rate for 50 kHz I and Q signals, and advantages may be obtained in oversampling to some degree.

What is claimed is:

1. A radar receiver for a frequency modulated continuous wave radar signal, comprising:
    digitising means for producing digitised radar return signals from received radar return signals, said digitised radar return signals being directly representative of said received radar return signals;
    means for digitally filtering the digitised radar return signals; and
    means for correlating the filtered digitised radar return signals corresponding to a modulation period with each of a series of digitised reference modulation signals which are delayed by predetermined periods with respect to each other, to produce outputs corresponding to respective range cells, wherein the means for correlating is arranged to perform complex multiplication of the filtered digitised radar return signals with the digitised reference signals, and wherein the means for correlating is arranged to perform a complex summation of the results of the complex multiplication over a modulation period.

2. A radar receiver as claimed in claim 1, in which the means for correlating is arranged such that the output of the complex summation is sampled once per modulation period.

3. A radar receiver as claimed in claim 1, including accumulate and dump means for performing the complex summation for each range cell.

4. A radar receiver as claimed in claim 1, in which the means for correlating is arranged such that the said predetermined periods are one sample period in duration.

5. A method of analysing radar return signals for frequency modulated continuous wave radar signal, comprising:
    producing digitised radar return signals from received radar return signals, the digitised radar return signals being directly representative of the received radar return signals;
    digitally filtering the digitised radar return signals;
    correlating the filtered digitised radar return signals corresponding to a modulation period with each of a series of digitised reference modulation signals which are delayed by predetermined periods with respect to each other by performing complex multiplication of the filtered digitised radar return signals with the digitised reference signals, and performing a complex summation of the results of the complex multiplication over a modulation period; and
    producing outputs corresponding to respective range cells.

6. A radar receiver for range cell detection, comprising:
    (1) an RF front end section including means for performing a two-stage superheterodyne conversion to produce an IF signal at an output thereof, the means for performing a two-stage superheterodyne conversion including a local oscillator and the series connection of:
        (a) an antennae for receiving radar return signals;
        (b) a first mixer connected to the antennae for mixing the radar return signals with a variable frequency signal from the local oscillator;
        (c) a first bandpass filter connected to receive and filter an output from the first mixer;
        (d) a second mixer connected to mix an output signal from the first bandpass filter with a fixed frequency signal from the local oscillator; and
        (e) a second bandpass filter connected to receive and filter an output from the second mixer to produce the IF signal at an output thereof;
    (2) an A-D converter, connected to receive the IF output signal of the second bandpass filter of the front end section as an input, for producing a digital output signal;
    (3) a filter section, connected to receive the digital output signal from the A-D converter as an input, for producing filtered in-phase and quadrature phase signals at respective outputs thereof, the filter section including two mixers for mixing the received A-D converter output with two quadrature digital local oscillator signals to produce unfiltered in-phase and quadrature phase signals, respectively, each mixer followed by a series connection of a plurality of digital filters for removing out of band quantising noise from the in-phase and quadrature phase signals and for defining a receiver passband response characteristic, each series connection of filters including a decimation filter followed by at least one finite impulse response filter; and
    (4) a correlation section for cross-correlating the filtered in-phase and quadrature phase signals output from the filter section with each of a series of reference sweep signals delayed relative to each other corresponding to respective range cells, the correlation section including:
        (a) a reference sweep waveform generator for providing reference sweep signals, the generator containing digital samples in phase with in-phase and quadrature components of the reference sweep applied to the transmitted radar signal, the phase of the reference sweep being adjusted so that return radar signals from a target in the center of interest have sweeps exactly in phase with the reference sweep, the reference sweep generator further containing the complex conjugates of the digital samples of the reference sweep;
        (b) a series connection of a plurality of delay means for delaying the reference sweep generator output signals by a plurality of predetermined amounts;
        (c) a plurality of multiplying means for multiplying the filtered in-phase and quadrature phase outputs of the filter section corresponding to a sweep with the output signals of the reference sweep generator and as delayed by associated delay means; and (d) a plurality of integrator means for summing in complex form the outputs of associated multiplying means by performing an accumulate and dump function, the outputs of the integrator means being sampled at a frequency corresponding to the inverse of the sweep waveform period, so that one output is produced for each separate sweep, the outputs being reset to zero after a complex summation has been performed for the sample corresponding to one sweep of reference signals, each output of an integrator means corresponding to a respective range cell.

7. The receiver of claim 1, further comprising:

means for converting the received radar return signals to IF frequency, wherein said digitising means is operative to digitise radar return signals at said IF frequency; and means for digitally converting said digitised radar return signals to baseband digitised signals.

8. The method of claim 7, further comprising the steps of:

converting the received radar return signals to IF frequency, wherein the producing step is operative to produce digitised radar return signals at the IF frequency; and digitally converting the digitised radar return signals to baseband digitised signals.

* * * * *